United States Patent
Baillard et al.

(10) Patent No.: US 11,176,728 B2
(45) Date of Patent: Nov. 16, 2021

(54) ADAPTIVE DEPTH-GUIDED NON-PHOTOREALISTIC RENDERING METHOD AND DEVICE

(71) Applicant: INTERDIGITAL CE PATENT HOLDINGS, SAS, Paris (FR)

(72) Inventors: Caroline Baillard, Saint Sulpice la Foret (FR); Pierrick Jouet, Rennes (FR); Vincent Alleaume, Pace (FR)

(73) Assignee: INTERDIGITAL CE PATENT HOLDINGS, SAS, Paris (FR)

(*) Notice: Subject to any disclaimer, the term of this patent is extended or adjusted under 35 U.S.C. 154(b) by 0 days.

(21) Appl. No.: 15/439,878

(22) Filed: Feb. 22, 2017

(65) Prior Publication Data
US 2017/0249775 A1 Aug. 31, 2017

(30) Foreign Application Priority Data

Feb. 29, 2016 (EP) .................................... 16305227

(51) Int. Cl.
*G06T 15/02* (2011.01)
*G06T 7/55* (2017.01)
(Continued)

(52) U.S. Cl.
CPC .............. *G06T 15/02* (2013.01); *G06T 7/11* (2017.01); *G06T 7/13* (2017.01); *G06T 7/55* (2017.01);
(Continued)

(58) Field of Classification Search
CPC ..... G06T 7/55; G06T 7/11; G06T 7/13; G06T 15/02; G06T 2207/10028; G06T 2207/20221; G06T 2200/21
See application file for complete search history.

(56) References Cited

U.S. PATENT DOCUMENTS 5,048,095 A * 9/1991 Bhanu ...................... G06K 9/34
382/155
6,476,805 B1 11/2002 Shum et al.
(Continued)

FOREIGN PATENT DOCUMENTS

CN 101802873 A 8/2010
CN 101945295 A 1/2011
(Continued)

OTHER PUBLICATIONS

Vondrak, Real-time non-photorealistic rendering, Univerzita Karlova v Praze, p. 80 (Year: 2006).*
(Continued)

*Primary Examiner* — Phuc N Doan
(74) *Attorney, Agent, or Firm* — Invention Mine LLC (57) ABSTRACT

A method for rendering a non-photorealistic (NPR) content from a set (SI) of at least one image of a same scene is provided. The set of images (SI) is associated with a depth image comprising a set of regions. Each region corresponds to a region of a given depth. The method for rendering a non-photorealistic content includes generation of a segmented image having at least one segmented region generated with a given segmentation scale. The at least one segmented region corresponds to at least one region of the set of regions. A binary edge image is generated in which at least one binary edge region is generated with a given edge extraction scale, the at least one binary edge region corresponding to at least one region of the set of regions. The non-photorealistic content is rendered by combining the segmented image and the binary edge image.

24 Claims, 5 Drawing Sheets

(51) Int. Cl.
 *G06T 7/11* (2017.01)
 *G06T 7/13* (2017.01)
(52) U.S. Cl.
 CPC .............................. *G06T 2200/21* (2013.01);
  *G06T 2207/10028* (2013.01); *G06T*
  *2207/20221* (2013.01)

(56) References Cited

U.S. PATENT DOCUMENTS

| | | | | |
|---|---|---|---|---|
| 7,738,725 | B2* | 6/2010 | Raskar | G06T 15/02 382/199 |
| 8,665,341 | B2 | 3/2014 | Georgiev et al. | |
| 8,860,833 | B2 | 10/2014 | Georgiev et al. | |
| 9,607,207 | B1* | 3/2017 | Puri | G06K 9/00201 |
| 9,704,250 | B1* | 7/2017 | Shah | G06T 7/0065 |
| 2004/0212725 | A1* | 10/2004 | Raskar | G06T 15/02 348/370 |
| 2010/0177163 | A1* | 7/2010 | Yang | G06T 15/02 348/45 |
| 2012/0200673 | A1* | 8/2012 | Tagawa | H04N 5/23212 348/46 |
| 2012/0281132 | A1* | 11/2012 | Ogura | G06T 5/003 348/348 |
| 2013/0070049 | A1* | 3/2013 | Ha | H04N 5/144 348/43 |
| 2013/0188019 | A1 | 7/2013 | Christopher et al. | |
| 2014/0176592 | A1 | 6/2014 | Wilburn et al. | |
| 2015/0002724 | A1* | 1/2015 | Chuang | H04N 5/23229 348/346 |
| 2015/0003725 | A1* | 1/2015 | Wan | G06T 7/194 382/154 |
| 2015/0104101 | A1 | 4/2015 | Bryant et al. | |
| 2018/0033157 | A1* | 2/2018 | Whiteford | G06T 7/557 |
| 2018/0137610 | A1* | 5/2018 | Aflaki Beni | H04N 13/128 |

FOREIGN PATENT DOCUMENTS

| | | |
|---|---|---|
| CN | 102239506 A | 11/2011 |
| CN | 102472619 A | 5/2012 |
| CN | 102831582 A | 12/2012 |
| CN | 103067705 | 4/2013 |
| CN | 103942824 A | 7/2014 |
| CN | 105069808 A | 11/2015 |
| JP | 2005341569 A | 12/2005 |

OTHER PUBLICATIONS

Hickson, Efficient Hierarchical Graph-Based Segmentation of RGBD Videos—EHGSRV-Paper, pp. 9 (Year: 2014).*
Favaro, Color and depth based image segmentation using a game-theoretic approach, Master Thesis, Universita degli Studi di Padova (Year: 2012).*
Albregtsen, INF 4300—Digital Image Analysis, pp. slides 1-58 (Year: 2010).*
Markovic, Image Stylization from Stereo Views of Natural Scenes, URL: https://publik.tuwien.ac.at/files/pub-inf_4997.pdf, Feb. 2007 (Year: 2007).*
Hickson, Efficient Hierarchical Graph-Based Segmentation of RGBD Videos—2014-EHGSRV (Year: 2014).*
Saito, Comprehensible Rendering of 3-D Shapes—p. 197—1990 (Year: 1990).*
Antunes, All-in-Focus Imaging Using a Series of Images on Different Focal Planes, 2005 (Year: 2005).*
Ahuja, "A Transform for Multiscale Image Segmentation by integrated Edge and Region Detection", IEEE Transactions on Pattern Analysis and Machine Intelligence, vol. 18, No. 12, Dec. 1996, pp. 1211-1235.
Kyprianidis et al., "Image Abstraction by Structure Adaptive Filtering", Proceedings of EG UK Theory and Practice of Computer Graphics (2008), pp. 51-58.
Pertuz et al., "Focus aided scene segmentation", Computer Vision and Image Understanding, vol. 133, Oct. 13, 2014, pp. 66-75.
Erdelyi et al., "Multi-Level Cartooning for Context-Aware Privacy Protection in Visual Sensor Networks", MediaEval 2014 Workshop, Barcelona, Spain, Oct. 16, 2014, pp. 1-2.
Raskar et al., "Non-photorealistic Camera: Depth Edge Detection and Stylized Rendering using Multi-Fash Imaging", ACM Transactions on Graphics (TOG), vol. 23, No. 3, Aug. 2004, pp. 679-688.
Decarlo et al., "Stylization and Abstraction of Photographs", ACM Transactions on Graphics (TOG), vol. 21, No. 3, Jul. 2002, pp. 769-776.
Lopez-Moreno et al., "Stylized depiction of images based on depth perception", 8th International Symposium on Non-Photorealistic Animation and Rendering, Annecy, France, Jun. 7, 2010, pp. 109-118.
Xu et al., "Stylized Rendering of 3D Scanned Real World Environments", 3rd International Symposium on Non-Photorealistic Animation and Rendering, Annecy, France, Jun. 7, 2004, pp. 25-34.
Lopez-Moreno et al., "Non photorealistic, deph-based image editing", Computers and Graphics, vol. 35, No. 1, Nov. 19, 2010, pp. 99-111.
Masil et al., "Line drawing enhancement of historical architectural plan using difference-of-Gaussians filter", 8th IEEE International Conference on Humanoid, Nanotechnology, Information Technology Communication and Control, Environment and Management, Cebu Philippines, Dec. 9, 2015, pp. 1-5.

* cited by examiner

ADAPTIVE DEPTH-GUIDED NON-PHOTOREALISTIC RENDERING METHOD AND DEVICE

1. REFERENCE TO RELATED EUROPEAN APPLICATION

This application claims priority from European Application No. 16305227.7, entitled "Adaptive depth-guided non-photorealistic rendering method, corresponding computer program product, computer-readable carrier medium and device", filed on Feb. 29, 2016, the contents of which are hereby incorporated by reference in its entirety.

2. FIELD OF THE INVENTION

The present disclosure lies in the field of image processing and relates to a technique for rendering a non-photorealistic representation of a scene. More precisely, the disclosure pertains to a technique for rendering a non-photorealistic content, in view of a depth image associated with the scene. The technique of the present disclosure can be applied notably, but not exclusively, to a light field content obtained through a light field data acquisition device.

3. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Non-photorealistic rendering is an alternative to conventional photorealistic computer graphics. By exploiting principles of abstraction that are well known to artists, non-photorealistic rendering comprises rendering content (image or video) according to various artistic styles such as painting, drawing, technical illustration, etc. The objectives may be varied, from pure artistic goals to image simplification in order to clarify its meaningful structure.

Many non-photorealistic rendering techniques—such as the one consisting in creating cartoon-style image abstraction of a scene—rely on at least two main operations that have to be performed on a realistic representation of the scene (a photograph or a 3D model for example): region flattening and line drawing.

Region flattening comprises simplifying the image content by removing unnecessary details whilst preserving the meaningful visual information, using for instance image properties such as color.

Line drawing comprises extracting a consistent set of lines that compactly and aesthetically describes the content of the scene.

The problem of non-photorealistic rendering is very different depending on whether it is based on a 3D model or on a 2D representation of the scene. When rendering a 2D non-photorealistic content from a 3D model, line drawing may for example be derived from occluding contours or creases. When rendering a 2D non-photorealistic content from a 2D representation of the scene (technique usually referred to as "image-based non-photorealistic rendering", based for example on a photograph), there is no reliable way to access the 3D shape of the objects within the scene. All meaningful lines and regions must thus be extracted from the image itself. Most existing techniques for image-based non-photorealistic rendering rely on edge detection and/or segmentation methods, which are common approaches to image abstraction. Segmentation may be performed by the use of a mean shift algorithm, for example. As for extracting meaningful lines, the difference-of-Gaussian filter or enhanced related technique such as flow-guided difference-of-Gaussian (which significantly improves the line consistency whilst suppressing noise) have proven to be particularly effective for artistic illustrations.

However, there still remain several limitations to the existing solutions of image-based non-photorealistic rendering.

For example, many photographs comprise out-of-focus areas, where edge detection and segmentation algorithms perform poorly: they are less accurate and less robust in these areas. As a result, line drawing and flattened-regions borders are irregular and inconsistent in the corresponding areas of the rendered non-photorealistic content, which may turn out to be unpleasant or distracting to the eye.

Another drawback of the conventional non-photorealistic rendering techniques is that the whole image is processed in the same way, and the non-photorealistic effect is thus constant all over the resulting non-photorealistic content. In "Stylization and Abstraction of Photographs", DeCarlo et al. propose a technique for rendering a non-photorealistic content from a photograph, wherein the region of an image predicted to be meaningful is processed at a finer scale than the other regions. However, this technique does not take into account the composition of the image itself (in terms of foreground, background, etc.) to adapt the non-photorealistic effect in function of coherent part of the image (such as identified objects within the scene for example). Moreover, it does not address the already mentioned segmentation and edge extraction issues in out-of-focus areas.

It would hence be desirable to provide a technique for a non-photorealistic rendering of a content that would avoid at least one drawback of the prior art. For the sake of simplicity, throughout the description, the technique for a non-photorealistic rendering of a content is simply mentioned as a method for rendering a non-photorealistic content, although it addresses a non-photorealistic rendering of a content.

4. SUMMARY

According to an embodiment of the present disclosure, a method for rendering a non-photorealistic content from a set of at least one image of a same scene is provided. The set of at least one image is associated with a depth image comprising a set of regions, each region of said set of regions corresponding to a region of a given depth. Such a method comprises:

generating a segmented image, said segmented image comprising at least one segmented region generated with a given segmentation scale of a plurality of segmentation scales, said at least one segmented region corresponding to at least one region of said set of regions;

generating a binary edge image, said binary edge image comprising at least one binary edge region generated with a given edge extraction scale of a plurality of edge extraction scales, said at least one binary edge region corresponding to at least one region of said set of regions;

rendering said non-photorealistic content, by combining said segmented image and said binary edge image.

Hence, the present disclosure relies on a different approach for rendering a non-photorealistic content: the whole image representative of a scene is not processed in the same way, and it is possible to render a non-photorealistic content wherein the non-photorealistic effect varies across the image, with respect to depth information available in a depth image associated with the scene. With the proposed technique, region flattening (obtained for example via color segmentation) and line drawing (obtained via edge extraction) may vary across the image independently of one another.

According to an embodiment, a segmentation scale is determined from at least one region of said set of regions.

In that way, the segmentation scale applied to segment a region is function of the depths that are associated with this region.

According to an embodiment, a given segmented region corresponds to a given region of said set of regions, and the segmentation scale applied to said given segmented region is function of a difference between a depth of said given region of said set of regions, corresponding to said given segmented region, and a first reference depth.

In that way, the segmentation scale varies depending on a defocus degree of each part of the image, with respect to a first reference depth.

According to an embodiment, an edge extraction scale is determined from at least one region of said set of regions.

In that way, the edge extraction scale applied to obtain a binary edge region is function of the depths that are associated with this region.

According to an embodiment, a given binary edge region corresponds to a given region of said set of regions, and the edge extraction scale applied to said given binary edge region is function of a difference between a depth of said given region of said set of regions, corresponding to said given binary edge region, and a second reference depth.

In that way, the edge extraction scale varies depending on a defocus degree of each part of the image, with respect to a second reference depth.

According to another embodiment of the present disclosure, a segmented region is determined from a hierarchical image representation, which is obtained through a hierarchical segmentation of an all-in-focus image derived from said set of at least one image of a same scene.

Thus, as the hierarchical segmentation process is performed on the all-in-focus image—which has an extended depth of field—the segmentation process performs well everywhere in the image. Advantageously this hierarchical segmentation is performed once, independently from the first reference depth that may be obtained afterwards. In other words, the hierarchical image representation is for example pre-computed from the all-in-focus image once, during a pre-processing stage, and then used to render a new non-photorealistic content whenever a new first reference depth is obtained for a given scene. In that way, the computational power and the time required for rendering a new non-photorealistic content are thus optimized. The hierarchical segmentation of the all-in-focus image takes for example the form of a tree representation, and a segmented region is obtained, for example by extracting the corresponding segmented region from the segmented all-in-focus image, at a given level of the tree representation, said level corresponding to an expected segmentation scale for said segmented region.

According to another embodiment of the present disclosure, a binary edge region is determined from a weighted-edge representation, which is obtained through an edge extraction of an all-in-focus image derived from said set of at least one image of a same scene.

Thus, as the edge extraction process is performed on the all-in-focus image—which has an extended depth of field—the edge extraction process performs well everywhere in the image. Advantageously this edge extraction process is performed only once, independently from the second reference depth that may be obtained afterwards. In other words, the weighted-edge representation is for example pre-computed from the all-in-focus image once, during a pre-processing stage, and then used to render a new non-photorealistic content whenever a new second reference depth is obtained for a given scene. In that way, the computational power and the time required for rendering a new non-photorealistic content are thus optimized. The weighted-edge representation is the result of an edge extraction process (such as for example a difference of Gaussians filtering technique) that is applied to the all-in-focus image, and takes the form of a 2D representation wherein every extracted edge pixel is valued. A binary edge region is then obtained, for example by extracting the corresponding region in the weighted-edge representation of the all-in-focus image, and by using a threshold to keep more or less edges within said binary edge region, said threshold corresponding to an expected edge extraction scale for said binary edge region.

According to an embodiment, a granularity level of a segmentation scale increases as said difference between a segmented region depth and said first reference depth decreases.

In that way, more details are for example displayed in a region of interest corresponding to the first reference depth.

According to an embodiment, a granularity level of an edge extraction scale increases as said difference between a binary edge region depth and said second reference depth decreases.

In that way, more details are for example displayed in a region of interest corresponding to the second reference depth.

According to an embodiment, said first reference depth is obtained automatically, by a gaze-tracking analysis.

In that way, an alternative to a manual selection of the first reference depth is proposed, and a first reference depth corresponding to an eye-attractive area of the scene is automatically obtained.

According to an embodiment, said second reference depth is obtained automatically, by a gaze-tracking analysis.

In that way, an alternative to a manual selection of the second reference depth is proposed, and a second reference depth corresponding to an eye-attractive area of the scene is automatically obtained.

In one embodiment, first and second reference depths are one and the same reference depth.

According to an embodiment, said set of at least one image of a same scene is derived from a light field content delivered by a light-field data acquisition device.

In that way, an easily access to the pieces of data used for the implementation of the non-photorealistic content rendering method according to one embodiment of the present disclosure is provided, since these pieces of data—set of images of a same scene, all-in-focus image and depth image—are well-known light-field data acquisition device outputs.

The present disclosure also concerns a device for rendering a non-photorealistic content from a set of at least one image of a same scene. The set of images is associated with a depth image comprising a set of regions, each region of said set of regions corresponding to a region of a given depth. Such a device comprises:

- a module for generating a segmented image, said segmented image comprising at least one segmented region generated with a given segmentation scale of a plurality of segmentation scales, said at least one segmented region corresponding to at least one region of said set of regions;
- a module for generating a binary edge image, said binary edge image comprising at least one binary edge region generated with a given edge extraction scale of a plurality of edge extraction scales, said at least one binary edge region corresponding to at least one region of said set of region;
- a module for rendering said non-photorealistic content, by combining said segmented image and said binary edge image.

The present disclosure also concerns a computer program product downloadable from a communication network and/or recorded on a medium readable by a computer and/or executable by a processor, comprising program code instructions for implementing the method as described above.

The present disclosure also concerns a non-transitory computer-readable medium comprising a computer program product recorded thereon and capable of being run by a processor, including program code instructions for implementing the method as described above.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

It is to be understood that both the foregoing general description and the following detailed description are exemplary and explanatory and are not restrictive of the invention, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

5. BRIEF DESCRIPTION OF THE DRAWINGS

Embodiments of the present disclosure can be better understood with reference to the following description and drawings, given by way of example and not limiting the scope of protection, and in which.

The components in the figures are not necessarily to scale, emphasis instead being placed upon illustrating the principles of the invention.

6. DETAILED DESCRIPTION

The general principle of the present disclosure relies on a peculiar technique for rendering a non-photorealistic content from a set of at least one image of a same scene. As already presented in relation with prior art, non-photorealistic rendering consists in creating image abstraction (such as cartoon style image abstraction) that usually mainly relies on two tasks: region flattening and line drawing. As it will be described more fully hereafter with reference to the accompanying figures, it is proposed in the present disclosure to use depth information available in a depth image associated with the set of at least one image of scene to enhance image-based Non-Photorealistic Rendering (NPR).

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

While not explicitly described, the present embodiments and variants may be employed in any combination or sub-combination.

Figure 1:
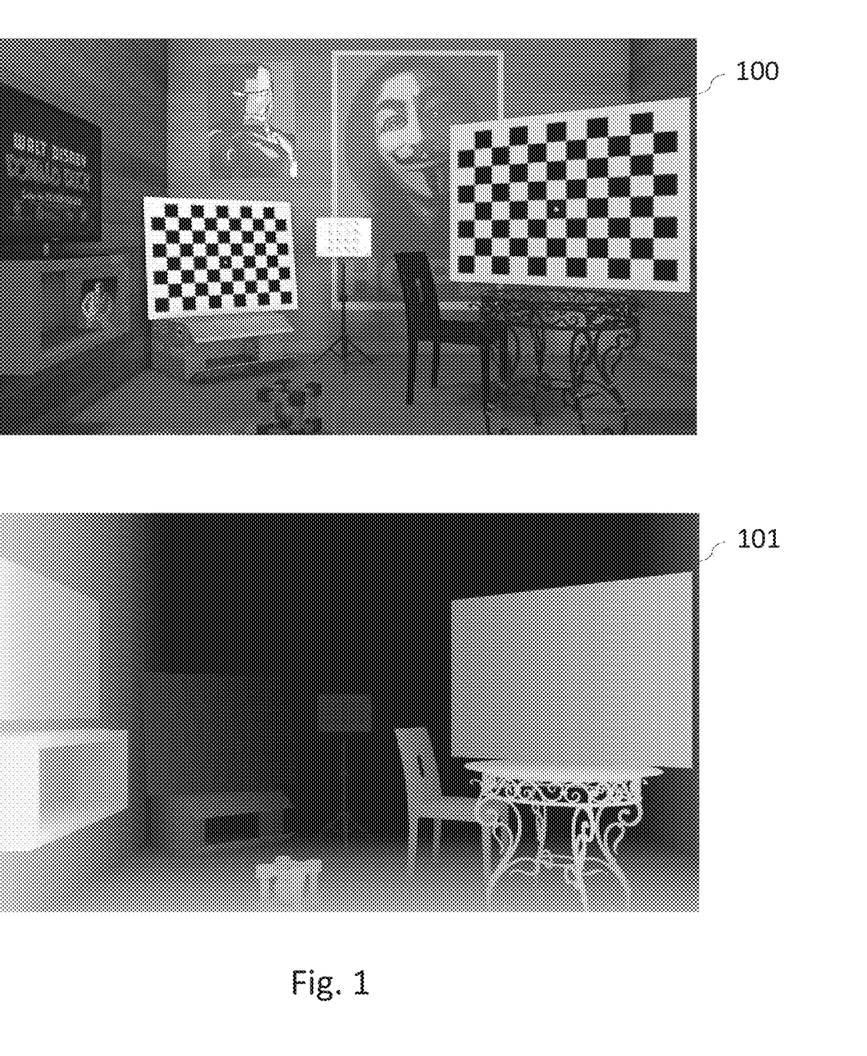
FIG. 1 shows an example of a depth image associated with a 2D representation of a 3D scene.

As introduced above, the proposed technique relies on the use of a depth image associated with a set of images of the scene to render non-photorealistic contents of some interest. The term depth image, which is sometimes referred to as depth data or depth map in the literature, should not be interpreted in a narrow sense. A depth image is for example a 2D representation (i.e. an image) of a 3D scene, in which each pixel is associated with depth or disparity information. Such information is representative of the distance of objects of the scene from a reference point (which is for example the position of the capture system used to capture a representation of the scene, or the position of another object in the scene). In other words, a depth image comprises depth information representative of the distance between objects in a captured scene, it can be stored as a digital file or table of any format. It can also be computed or acquired by any other means. FIG. 1 shows an example of a depth image (101) associated with 2D representation (100) of a scene. In this example, each pixel of depth image (101) is associated with depth information encoded in grayscale (the light intensity of each pixel is for instance encoded in grayscale on 16 bits). Of course, example of FIG. 1 is only illustrative, and a depth image may take other forms. However, whatever the form it takes, a depth image can been seen as an assembly of regions, i.e. a set of regions, each region of said set of regions corresponding to a region of a given depth.

According to the proposed technique, the depth image allows dividing a 2D representation (i.e. an image) of a scene into another set of regions, each region of said another set of regions corresponding to a region of a given depth, or to the union of several regions of different given depths, within the depth image. The general principle of the present disclosure comprises processing the regions of said another set of regions at different scales, to finally reconstruct a non-photorealistic content in which the non-photorealistic effect varies across the image.

Figure 2:
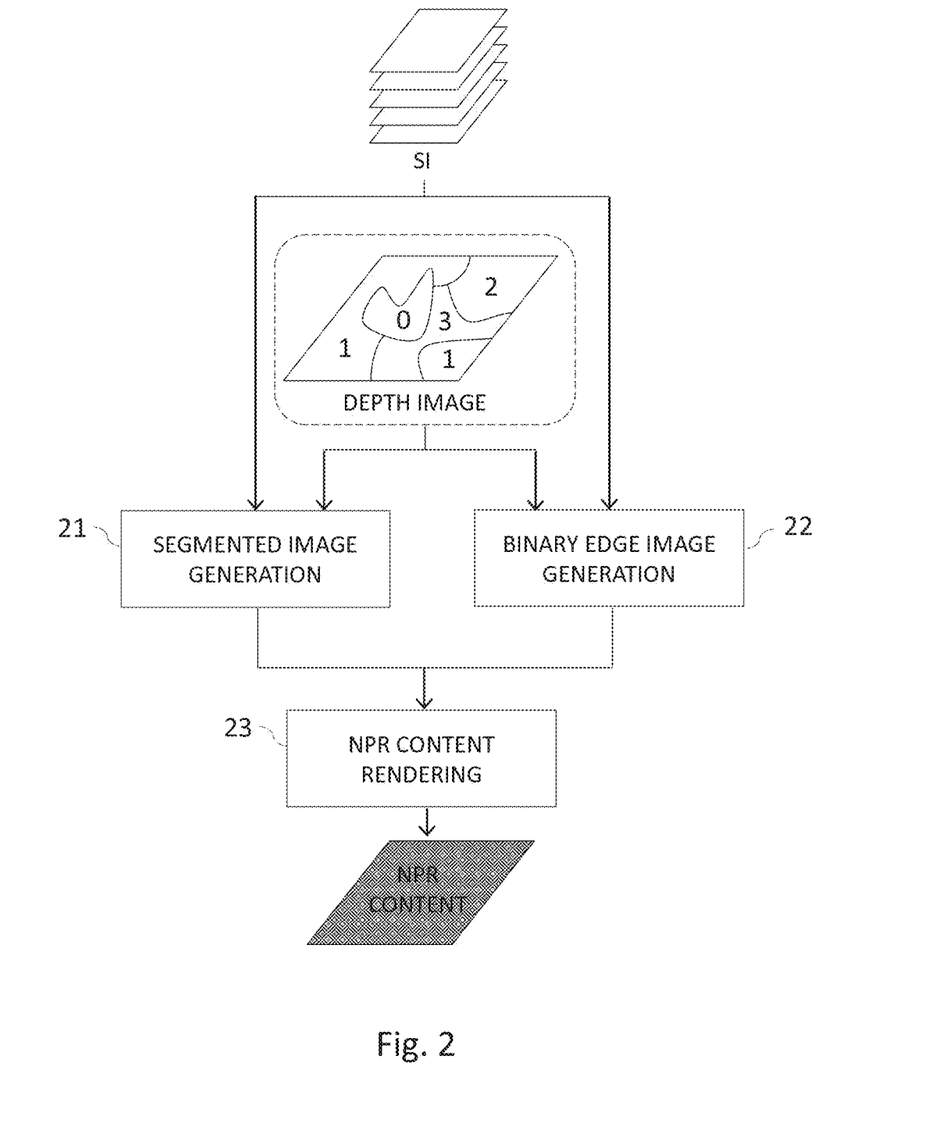
FIG. 2 is a flow chart for illustrating the general principle of the proposed technique for rendering a non-photorealistic content, according to an embodiment of the present disclosure.

In one embodiment of the present disclosure, the proposed technique relies on three main steps, as illustrated in relation with FIG. 2:
- a first step 21 for generating a segmented image of the scene, which is formed by the assembly of a set of segmented regions, each of which being segmented at a segmentation scale which may be different from the one applied to another region of said set of segmented regions;
- a second step 22 for generating a binary edge image of the scene, which is formed by the assembly of a set of binary edge regions, each of which being processed at an edge extraction scale which may be different from the one applied to another region of said set of binary edge regions;
- a third step 23 for rendering a non-photorealistic content representative of the scene, by combining the segmented image generated at the first step 21 and the binary edge image generated at the second step 22.

The regions comprised in the set of segmented regions (at step 21) or in the set of binary edge regions (at step 22) correspond to regions of a given depth, or to the union of several regions of different given depths, within the depth image.

The segmentation mentioned at step 21 may be any type of image-segmentation technique, such as color-based segmentation or texture-based segmentation (even if, in the foregoing, the exemplary embodiments are described in relation to a color-based segmentation).

The first and the second steps (21, 22) are processed in parallel or one after the other, whatever the order.

By combining segmented image and binary edge image, at step 23, it is meant here to superimpose the edges of the binary edge image generated at step 22 over the segmented image generated at step 21.

The present disclosure thus described an original non-photorealistic rendering technique, in which the whole image of a scene is not processed in the same way. As it will be presented below, in relation with several other embodiments of the present disclosure, the proposed technique is very flexible and offers many non-photorealistic effect possibilities, while maintaining a significant degree of consistency in terms of image composition of the generated non-photorealistic content thanks to the use of depth information.

Figure 3:
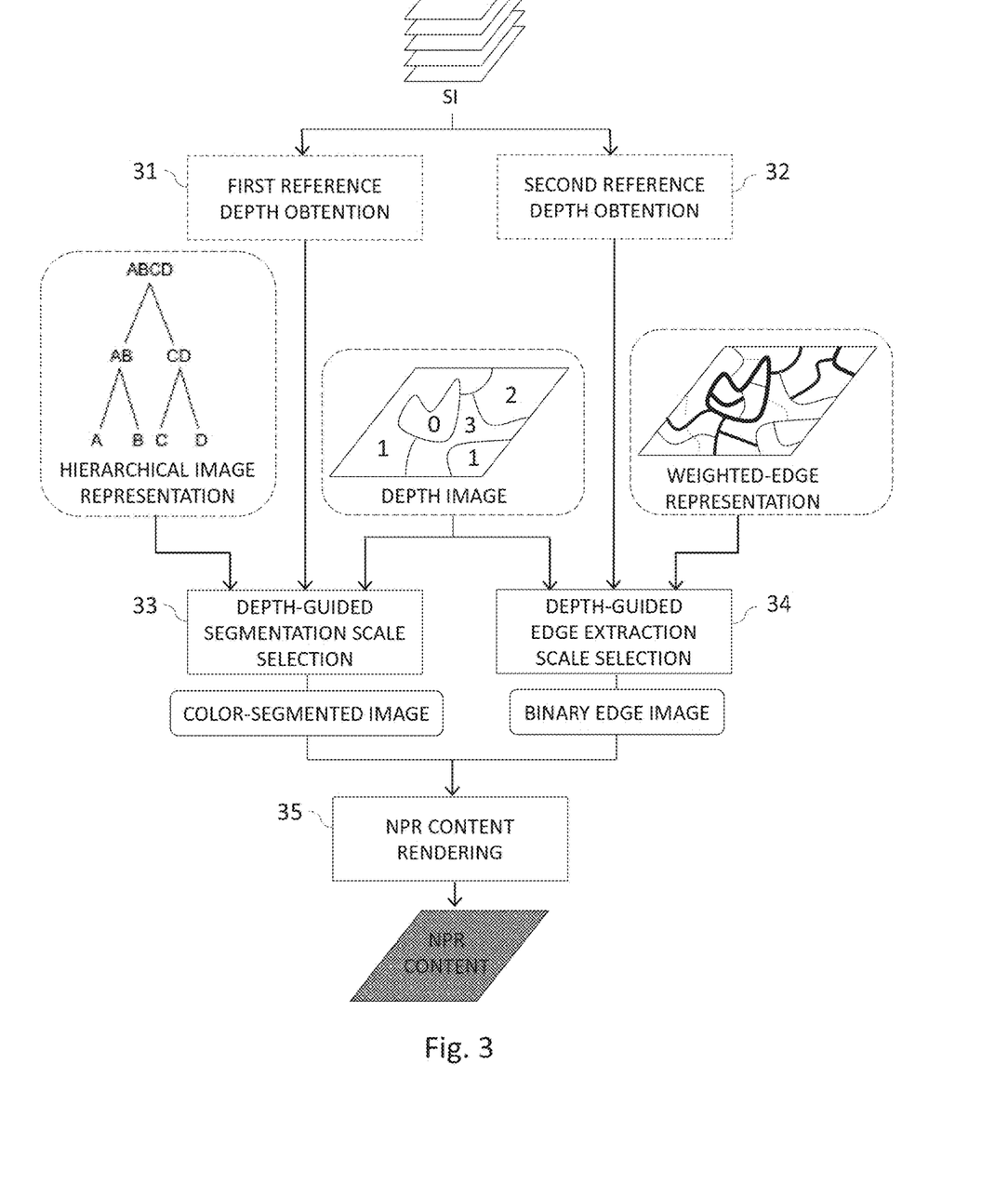
FIG. 3 is a flow chart for explaining a process for rendering a non-photorealistic content according to an embodiment of the present disclosure.

FIG. 3 is a flow chart for explaining a process for rendering a non-photorealistic content according to an embodiment of the present disclosure. A set of at least one images (SI) of a same scene is available. Images comprised in the set of images (SI) correspond to 2D representation of the scene seen from a same viewing angle. They are derived for example from a light field content delivered by a light-field data acquisition device used to capture the scene. Alternatively, they correspond to a series of 2D images of the scene each taken from a same viewpoint but at different focalization distance, by the use of a conventional handheld camera. They may also be images of the scene simulated with Computer Generated Imagery (CGI).

A depth image, associated with the set of images (SI) is also available. This depth image may have been obtained by any means. For example, it is computed from the light field content delivered by a light-field data acquisition device used to capture the scene, or from several images of the scene taken at different viewpoint by the use of a conventional camera.

The particular embodiment of FIG. 3 involves the use of two additional pieces of data to perform the rendering of the non-photorealistic content, in addition to the depth image. These two pieces of data are in one hand a hierarchical image representation (which will be used afterwards to generate a depth-guided segmented image of the scene) and in another hand a weighted-edge representation (which will be used afterwards to generate a depth-guided binary edge image of the scene).

Figure 4:
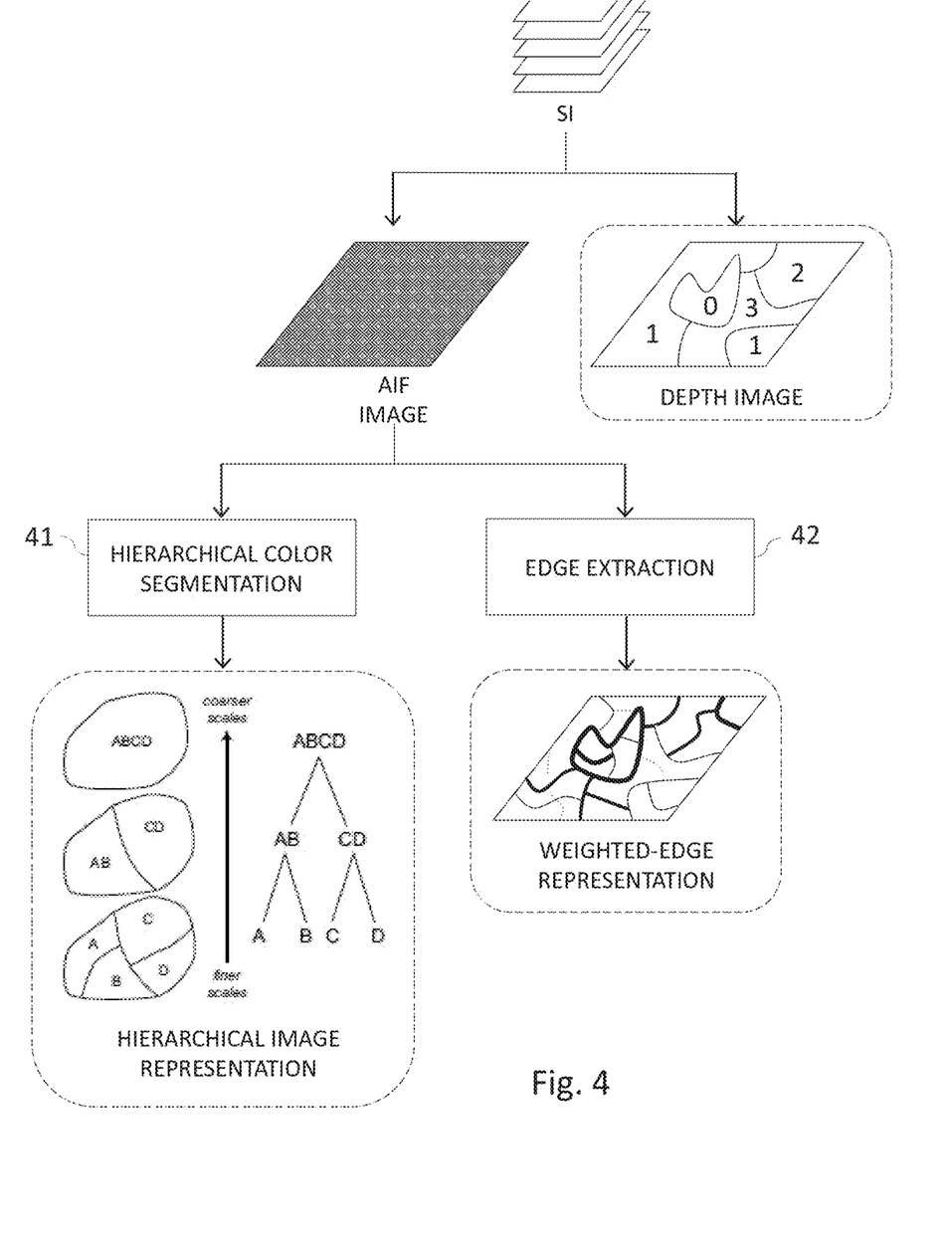
FIG. 4 is a flow chart describing a pre-processing stage that is implemented to generate pieces of data useful to render a non-photorealistic content, according to an embodiment of the present disclosure.

In one embodiment, these two pieces of data are generated in advance, for example at a pre-processing stage, prior to the rendering of a non-photorealistic content, as illustrated in relation with FIG. 4. During this pre-processing stage, a hierarchical segmentation step 41 and an edge extraction step 42 are performed on an image representative of the scene. The image on which this pre-processing stage is applied may be any image of the set of images (SI). According to a preferred embodiment, it is a particular image chosen among this set of images (SI), or computed from this set of images (SI), as it will be described further below. In one embodiment, this pre-processing stage also provides the opportunity to generate the depth image that will be useful afterwards to perform the rendering of the non-photorealistic content.

At step 41, a hierarchical image representation is generated from an image of the scene. Such a representation takes the form of an ordered set of segmented images of the whole scene, each segmented image having a different segmentation scale than the others. Many multi-scale segmentation algorithms exist in the vision community, that allow obtaining such a hierarchical image, and this technique is therefore not described in details here. For example, "Stylization and abstraction of photographs" paper [DeCarlo 2002], already cited in relation with prior art, proposes one suitable technique to obtain a hierarchical image representation, based on color segmentation. This hierarchical image representation may be represented like a tree, as illustrated in FIG. 4 (the tree drawing of FIG. 4 is extracted from the "Stylization and abstraction of photographs" paper). Once this hierarchical image representation is generated, a segmented-image is obtainable at any given scale available: depending on the level of the tree, a color-segmented image that contain many regions (at finer scales), or, on the contrary few regions (at coarser scales) may thus be obtained.

At step 42, a weighted-edge representation of the scene is generated. The weighted-edge representation is the result of an edge extraction process (such as difference of Gaussians or a flow-guided difference of Gaussians filtering techniques for example) that is applied to an image of the scene, and takes the form of a 2D representation wherein every extracted edge pixel is valued. Because the edge pixels of the weighted-edge representation are valued, it is possible to threshold this representation to obtain a binary edge image of the scene containing more or less edges, depending on the threshold value. To some extend, this threshold can thus be considered as an edge extraction scale, allowing to obtain a binary edge image that contains many edges (if said threshold is low) or, on the contrary, few edges (if said threshold is high).

In one embodiment, hierarchical segmentation process of step 41 and edge extraction process of step 42 are performed on any image among the set of images (SI) of the scene. However, in a preferred embodiment, when more than one image are available in the set of images (SI), it is of particular interest to perform hierarchical segmentation and edge extraction processes on an image which one knows it will lead to good results. This is done, for example, by identifying (manually or automatically) in the set of images (SI) a "best-in focus" image, i.e. the image that has the best depth of field. In some embodiments, such an image is also computed from the set of images (SI). For example, if the set of images (SI) is derived from a light field content, it may be possible to compute an all-in-focus image (AIF) in which all the pixels are in focus, whatever their depth. As this all-in-focus image has an extended depth of field, the segmentation and edge extraction algorithms perform well everywhere. The accuracy of the resulting hierarchical image representation and weighted-edge representation is thus improved, which present benefits for the rendering of the non-photorealistic content, as it will be described below.

Referring back to FIG. 3, the use of the depth image, the hierarchical image representation and the weighted-edge representation to render a non-photorealistic content is now explained, according to a particular embodiment of the present disclosure.

As already introduced previously, a non-photorealistic rendering according to the general principle of the proposed technique comprises combining a segmented image and a binary image of a scene, said segmented image and said binary edge image being generated in a particular way with respect to a depth image associated with the scene.

At step 33, depth image and hierarchical image representation are used to generate a color-segmented image of the scene, in which the segmentation scale varies across the image. Since the segmentation of the whole image at different segmentation scales has already been done during the pre-processing stage described in relation with FIG. 4, and is available in the hierarchical image representation, step 33 can thus be seen as a depth-guided segmentation scale selection rather than a step of pure segmentation.

The mechanisms implemented at step 33 are now detailed.

For each region corresponding to a region of a given depth in the depth image, a level associated with that given depth is selected in the hierarchical image representation tree, according to a predefined mapping. This level is representative of a particular segmentation scale, and the associated segmented image of the whole scene is available in the hierarchical image representation. Using the depth image, it is thus possible to extract from this segmented image of the whole scene a segmented region corresponding to the region of the considered depth in the depth image.

This operation is repeated to retrieve a segmented region for every region of a given depth present in the depth image.

Once all the segmented regions corresponding to all the regions present in the depth image have been retrieved, it is then possible to reconstruct a segmented image of the whole scene, by putting back together all the segmented regions, like a puzzle. Since all segmented regions are segmented at different scales, the process of step 33 thus results in the generation of a segmented image of the whole scene, in which the segmentation scale varies across the image.

The mapping between a depth and the segmentation scale to select in the hierarchical image representation, for a region having this depth, can be any predefined function.

In one embodiment of the present disclosure, this mapping is adaptive, depending for instance on the number of depth levels available in the depth image. For example, region corresponding to a foreground of the scene are processed at the finer segmentation scale available in the hierarchical image representation, while region corresponding to a background of the scene are processed at the coarser segmentation scale available in the hierarchical image representation. All the intermediate depths are then processed at intermediate segmentation scale available in the hierarchical image representation. Previous example is of course non-limitative, and other adaptive mapping may be proposed, as illustrated below.

In another embodiment of the present disclosure, at an optional step 31, prior to the depth-guided segmentation scale selection of step 33, a first reference depth is obtained. The depth-guided segmentation scale selection is then performed so that the segmentation scale selected for a same-depth region of the image is function of a difference between said region depth and said first reference depth. In other words, according to this embodiment, the segmentation scale varies depending on a kind of defocus degree of each part of the image, with respect to the first reference depth. In a variant, this first reference depth is obtained manually, for example by allowing a user to select, through the use of an input device and a graphical user interface, a particular region of interest within an image of the scene (an image of the set of images (SI) for instance) displayed on a screen. Alternatively, the first reference depth is obtained automatically, for example thanks to gaze tracking technique that allows detecting region of particular interest in an image. In a particular implementation of this embodiment, the granularity level of a segmentation scale increases as said difference between a segmented region depth and said first reference depth decreases. Within the region having the first reference depth, the finer segmentation scale available in the hierarchical image representation is for example the one selected. The coarser segmentation scale available in the hierarchical image representation is for example selected for the region having the largest depth difference in view of the first reference depth.

A process fairly similar to the one that has just been described is performed at step 34, regarding edge extraction. At step 34, depth image and weighted-edge representation are used to generate a binary edge image of the scene, in which the edge extraction scale varies across the image. Since the edge extraction of the whole image has already been done during the pre-processing stage described in relation with FIG. 4, leading to the generation of a weighted-edge representation wherein each detected edge is associated with a value representative of its importance (e.g. its gradient) in the scene, step 34 can thus be seen as a depth-guided edge extraction scale selection rather than a step of pure edge extraction.

The mechanisms implemented at step 34 are now detailed.

For each region corresponding to a region of a given depth in the depth image, a threshold associated with that given depth is selected, according to a predefined mapping. This threshold is then used to threshold the weighted-edge representation, so that a binary edge image of the whole scene, containing more (low threshold) or less (high threshold) edges, is obtained. This threshold is thus representative of a particular edge extraction scale. Using the depth image, it is then possible to extract from this binary edge image of the whole scene a binary edge region corresponding to the region of the considered depth in the depth image.

This operation is repeated to retrieve a binary edge region for every region of a given depth present in the depth image.

Once all the binary edge regions corresponding to all the regions present in the depth image have been retrieved, it is then possible to reconstruct a binary edge image of the whole scene, by putting back together all the binary edge regions, like a puzzle. Since all binary edge regions have different edge extraction scales, the process of step 34 thus results in the generation of a binary edge image of the whole scene, in which the edge extraction scale varies across the image.

The mapping between a depth and the edge extraction scale to apply to the weighted-edge representation, for a region having this depth, can be any predefined function.

In one embodiment of the present disclosure, this mapping is adaptive, depending on the number of depth levels available in the depth image. For example, region corresponding to a foreground of the scene is processed with a very low threshold ($H_{min}$), while region corresponding to a background of the scene is processed with a very high threshold ($H_{max}$). All the intermediate depths are then be processed at intermediate edge extraction scale, i.e. threshold between $H_{min}$ and $H_{max}$. Previous example is of course non-limitative, and other adaptive mapping may be proposed, as illustrated below.

In another embodiment of the present disclosure, at an optional step 32, prior to the depth-guided edge extraction scale selection of step 34, a second reference depth is obtained. The depth-guided edge extraction scale selection is then performed so that the edge extraction scale selected for a same-depth region of the image is function of a difference between said region depth and said second reference depth. In other words, according to this embodiment, the edge extraction scale varies depending on a kind of defocus degree of each part of the image, with respect to the second reference depth. This second reference depth may be obtain manually, for example by allowing a user to select, through the use of an input device and a graphical user interface, a particular region of interest within an image of the scene (an image of the set of images (SI) for instance) displayed on a screen. Alternatively, it may also be done automatically, for example thanks to gaze tracking technique that allows detecting region of particular interest in an image. In a particular implementation of this embodiment, the granularity level of an edge extraction scale increases as said difference between a binary edge region depth and said second reference depth decreases. For example, within the region having the second reference depth, all the extracted edges that are available in the corresponding region of the weighted-edge representation will be displayed when rendering the non-photorealistic content (by using a very low threshold). For the other regions, the threshold is increased, in such a way that less and less edges are displayed when the depth of the considered region gets more different from the second reference depth (only the edges with strongest gradients are kept). In one implementation, one can decide not to display any edge when the difference in depth is above a given threshold.

Of course, steps 33 and 34 may be processed in parallel or one after the other, whatever the order.

At step 35, the non-photorealistic content is finally rendered, by combining the segmented image generated at step 33 and the binary edge image generated at step 34. As already described previously, by combining segmented image and binary edge image, it is meant here to superimpose the edges of the binary edge image over the segmented image, thus resulting in the rendering of the final non-photorealistic content.

Various considerations are now presented, with respect to the proposed technique, and more precisely to the particular embodiment presented in relation with FIGS. 3 and 4.

The implementation of a pre-processing stage as the one described in relation with FIG. 4 has many advantages since it allows computing in advance pieces of data that may be used afterwards to generate several different non-photorealistic rendering of a same scene. In that way, once the hierarchical image representation and the weighted-edge representation have been computed for a given scene, the computational power and the time required to render any non-photorealistic representation of that scene are reduced.

The use of an all-in-focus image (or at least of a best-in-focus image) as a base to perform this pre-processing stage is also of great interest, since it allows obtaining very accurate hierarchical image representation and weighted-edge representation. As a consequence, the transitions within non-photorealistic content generated according to such an embodiment of the present disclosure are regular and consistent. It is important to note that it would not be the case if this pre-processing stage was directly applied to an ordinary image (randomly selected from the set of images (SI) of the scene for example): because of the blurring effect in the non-focus part of such an image, line drawing and flattened-regions borders within the generated non-photorealistic content would be irregular and inconsistent, which may turn out to be unpleasant or distracting to the eye. The proposed technique is therefore particularly adapted to generate non-photorealistic content from a set of images derived from a light field content, since light field content usually allows easy generation of depth image and all-in-focus image associated with the captured scene.

Embodiments adapted to different fields of application may thus be considered, for example embodiments adapted to non-photorealistic rendering from light field content on one hand, and embodiments adapted to non-photorealistic rendering from conventional images on the other hand.

Embodiments relating to light field content are implemented for example in light field capture devices such as a plenoptic device or a camera array, or in any device dealing with light field data. To some extent, the proposed technique thus allows rendering a non-photorealistic content from a set of plenoptic data associated with the scene, since a set plenoptic data comprises—or allows the computation of—depth image and all-in-focus image, from which accurate hierarchical image representation and weighted-edge representation of the scene may be generated. In these embodiments, not only the non-photorealistic effect varies across the rendered non-photorealistic content, but the general process of rendering a non-photorealistic content is also improved (the problem of non-photorealistic rendering within out-of-focus part of images being resolved, by the use of the all-in-focus image at the pre-processing stage).

Embodiments relating to conventional images are for example implemented in any device wherein image processing is of interest, such as conventional cameras, computers, TV set and so on. They may also be implemented in image or video processing software embedded in these devices. These embodiments also allow rendering a non-photorealistic content wherein the plenoptic effect varies across the content, thanks to the use of both a set of images of a same scene and an associated depth image. Depending on the images available in the set of images, a best-in-focus image may also be selected or computed and used at the pre-processing stage, thus leading to an enhanced non-photorealistic rendering.

It should also be noted that the proposed technique is very flexible, and offers great possibilities in terms of non-photorealistic effect that may be obtained. For example, regarding the non-photorealistic rendering process described in FIG. 3, it should be noted that the first and second reference depths may or may not be one and the same reference depth. It should also be noted that the rules (i.e. the mapping) that guide the segmentation scale selection and the edge extraction scale can be very different of each other. Depending on the mappings implemented to select these scales, it is even possible to perform non-photorealistic rendering that is limited to region flattening without line drawing, or the reverse.

Finally, with the proposed technique, a certain consistency is maintained in terms of image composition, since it allows rendering non-photorealistic content wherein non-photorealistic effect may vary across the image, but may be constant across each same-depth region of the image, usually corresponding to coherent part of the scene (such as identified objects within the scene).

It is to be understood that the present disclosure can be embodied in various forms, and is not to be limited to the examples discussed above. In particular, while the proposed technique has been described mainly with reference to the rendering of non-photorealistic contents that are images, it may also be applied for the rendering of video non-photorealistic contents, without departing from the scope of the present disclosure.

Figure 5:
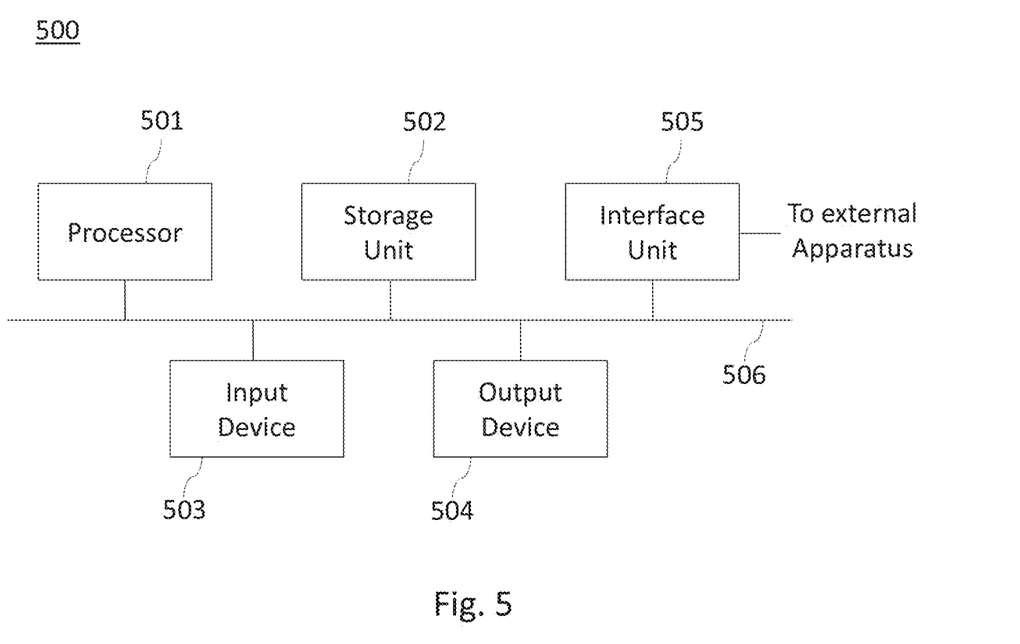
FIG. 5 is a schematic block diagram illustrating an example of an apparatus for rendering a non-photorealistic content according to an embodiment of the present disclosure.

FIG. 5 is a schematic block diagram illustrating an example of a device for rendering a non-photorealistic content according to an embodiment of the present disclosure. Such a device may be any device in which image processing may be of interest: a computer, a set-top box, a TV set or any portable handheld device such as a smartphone, a tablet, a light field capture device for example.

An apparatus 500 illustrated in FIG. 5 includes a processor 501, a storage unit 502, an input device 503, an output device 504, and an interface unit 505 which are connected by a bus 506. Of course, constituent elements of the computer apparatus 500 may be connected by a connection other than a bus connection using the bus 506.

The processor 501 controls operations of the apparatus 500. The storage unit 502 stores at least one program to be executed by the processor 501, and various data, including for example depth image, all-in-focus image, computed hierarchical image representation and weighted-edge representation, parameters used by computations performed by the processor 501, intermediate data of computations performed by the processor 501, and so on. The processor 501 is formed by any known and suitable hardware, or software, or a combination of hardware and software. For example, the processor 501 is formed by dedicated hardware such as a processing circuit, or by a programmable processing unit such as a CPU (Central Processing Unit) that executes a program stored in a memory thereof.

The storage unit 502 is formed by any suitable storage or means capable of storing the program, data, or the like in a computer-readable manner. Examples of the storage unit 502 include non-transitory computer-readable storage media such as semiconductor memory devices, and magnetic, optical, or magneto-optical recording media loaded into a read and write unit. The program causes the processor 501 to perform a process for rendering a non-photorealistic content according to an embodiment of the present disclosure as described previously.

The input device 503 is formed for example by a keyboard, a pointing device such as a mouse, or the like for use by the user to input commands. In embodiments wherein non-photorealistic rendering is performed within an image capture device such as a light field capture device or a conventional camera for example, the input device 503 also comprises the optical device used to capture the scene. Other additional devices may be part of the input device, such as a camera to perform gaze tracking for example.

The output device 504 is formed for example by a display device to display, for example, the final image determined by applying the method for rendering previously described. The input device 503 and the output device 504 may be formed integrally by a touchscreen panel, for example. The input device 503 may be used by an operator for selecting the first and/or second reference depths further used to determine segmentation and edge extraction scales to be applied to each regions depending on their defocus degree with respect to these reference depths. Such first and second reference depths may then be stored into storage unit 502.

The interface unit 505 provides an interface between the apparatus 500 and an external apparatus. The interface unit 505 may be communicable with the external apparatus via cable or wireless communication. In some embodiments, the external apparatus may be a display device, or a device configured to implement the pre-processing stage previously described, when this implementation is not supported by apparatus 500 itself for example.

Although only one processor 501 is shown on FIG. 5, it must be understood that such a processor may comprise different modules and units embodying the functions carried out by apparatus 500 according to embodiments of the present disclosure, such as:

a module for generating a segmented image, said segmented image comprising at least one segmented region generated with a given segmentation scale of a plurality of segmentation scales, said at least one segmented region corresponding to at least one region of said set of regions;

a module for generating a binary edge image, said binary edge image comprising at least one binary edge region generated with a given edge extraction scale of a plurality of edge extraction scales, said at least one binary edge region corresponding to at least one region of said set of region;

a module for rendering a non-photorealistic content, by combining said segmented image and said binary edge image.

These modules and units may also be embodied in several processors 501 communicating and co-operating with each other.

The invention claimed is:

1. A method comprising:
obtaining an all-in-focus (AIF) image from a set of images, the AIF image comprising a first set of regions, with different regions associated with different depths;
obtaining a reference depth of a region of interest;
obtaining a first image from the AIF image by generating a second set of regions based on the first set of regions of the AIF image;
wherein a region of the second set of regions is generated using a scale based on a difference between a depth of the region and the reference depth of the region of interest;
wherein a granularity level of the scale increases as the difference between the reference depth of the region of interest and the depth of the region decreases;
wherein different scales of region generation correspond to different granularity levels; and
non-photo-realistic rendering the set of images by combining the first image with a second image from the set of images.

2. The method of claim 1, wherein the second set of regions is obtained from a hierarchical segmentation of the AIF image.

3. The method of claim 1, wherein the second set of regions is obtained from an edge extraction of the AIF image.

4. The method of claim 1, wherein the second set of regions is obtained by thresholding a weighted edge representation of the AIF image according to an edge extraction scale.

5. The method of claim 1, wherein the second image is obtained from an edge extraction of the AIF image, wherein the second image comprises a set of edge regions of different depths generated with different edge extraction scales, wherein different edge extraction scales correspond to different granularity levels of edge extraction, wherein an edge region of the set of edge regions is generated from the AIF image with an edge extraction scale depending on a defocus degree between the edge region and the reference depth.

6. The method of claim 5, wherein the set of edge regions is obtained by thresholding a weighted edge representation of the AIF image according to the edge extraction scale.

7. The method of claim 5, wherein combining the first image with the second image comprises displaying edges of the second image superimposed over the first image.

8. The method of claim 1, wherein the reference depth is obtained automatically by a gaze-tracking analysis.

9. The method of claim 1, wherein the set of images is derived from a light field content delivered by a light-field data acquisition device.

10. A device comprising:
a processor; and
a memory storing instructions that, when executed by the processor, cause the device to:
obtain an all-in-focus (AIF) image from a set of images, the AIF image comprising a first set of regions, with different regions associated with different depths;
obtain a reference depth of a region of interest;
obtain a first image from the AIF image by generating a second set of regions based on the first set of regions of the AIF image;
wherein a region of the second set of regions is generated using a scale based on a difference between a depth of the region and the reference depth of the region of interest;
wherein a granularity level of the scale increases as the difference between the reference depth of the region of interest and the depth of the region decreases;
wherein different scales of region generation correspond to different granularity levels; and
non-photo-realistic render the set of images by combining the first image with a second image from the set of images.

11. The device of claim 10, wherein the instructions further cause the device to obtain the second set of regions from a hierarchical segmentation of the AIF image.

12. The device of claim 10, wherein the instructions further cause the device to obtain the second set of regions from an edge extraction of the AIF image.

13. The device of claim 10, wherein the instructions further cause the device to obtain the second set of regions by thresholding a weighted edge representation of the AIF image according to an edge extraction scale.

14. The device of claim 10, wherein the instructions further cause the device to obtain the second image from an edge extraction of the AIF image, wherein the second image comprises a set of edge regions of different depths generated with different edge extraction scales corresponding to different granularity levels of edge extraction, wherein an edge region of the set of edge regions is generated from the AIF image with an edge extraction scale depending on a defocus degree between the edge region and the reference depth.

15. The device of claim 14, wherein combining the first image with the second image comprises displaying edges of the second image superimposed over the first image.

16. The device of claim 10, wherein the reference depth is obtained automatically by a gaze-tracking analysis.

17. The device of claim 10, wherein the set of images is derived from a light field content delivered by a light-field data acquisition device.

18. A non-transitory computer-readable medium comprising instructions that cause a processor to perform:
obtaining an all-in-focus (AIF) image from a set of images, the AIF image comprising a first set of regions, with different regions associated with different depths;
obtaining a reference depth of a region of interest;
obtaining a first image from the AIF image by generating a second set of regions based on the first set of regions of the AIF image;
wherein a region of the second set of regions is generated using a scale based on a difference between a depth of the region and the reference depth of the region of interest;
wherein a granularity level of the scale increases as the difference between the reference depth of the region of interest and the depth of the region decreases;
wherein different scales of region generation correspond to different granularity levels; and
non-photo-realistic rendering the set of images by combining the first image with a second image from the set of images.

19. The method of claim 1, further comprising obtaining the reference depth of the region of interest by at least one of gaze-tracking analysis and receiving a user selection through a user interface.

20. The device of claim 10, wherein the reference depth of the region of interest is obtained by at least one of gaze-tracking analysis and receiving a user selection through a user interface.

21. The method of claim 1, wherein the reference depth of the region of interest is user-selected.

22. The method of claim 1, wherein the scale is associated with a number of regions.

23. The method of claim 1, wherein the scale is associated with a number of edges.

24. The method of claim 1, wherein the scale is associated with at least one of a number of regions and a number of edges.

* * * * *